United States Patent [19]

Acuff

[11] Patent Number: 5,208,753
[45] Date of Patent: May 4, 1993

[54] FORKLIFT ALIGNMENT SYSTEM

[76] Inventor: Dallas W. Acuff, 507 Columbia Dr., Apt. L, Columbia, Mo. 56201

[21] Appl. No.: 676,525

[22] Filed: Mar. 28, 1991

[51] Int. Cl.$^5$ .......................... B66F 9/06; G06F 15/50
[52] U.S. Cl. ............................ 364/424.07; 364/571.08; 414/633
[58] Field of Search .................... 364/424.07, 424.01, 364/424.02, 571.01, 571.08; 318/568.13, 568.14, 568.16; 414/612, 615, 631, 633

[56] References Cited

U.S. PATENT DOCUMENTS

| | | | |
|---|---|---|---|
| 3,700,907 | 10/1972 | Myer et al. | 250/550 |
| 3,854,820 | 12/1974 | Hansen | 356/138 |
| 4,279,328 | 7/1981 | Ahlbom | 187/9 R |
| 4,499,541 | 2/1985 | Yuki et al. | 364/424.07 |
| 4,520,443 | 5/1985 | Yuki et al. | 364/424.07 |
| 4,547,844 | 10/1985 | Adams | 364/189 |
| 4,549,845 | 10/1985 | Ramsey, Jr. | 414/620 |
| 4,566,032 | 1/1986 | Hirooka et al. | 358/103 |
| 4,604,025 | 8/1986 | Hammound | 414/698 |
| 4,678,329 | 7/1987 | Lukowski, Jr. et al. | 356/152 |
| 4,724,480 | 2/1988 | Hecker et al. | 358/101 |
| 5,011,358 | 4/1991 | Andersen et al. | 414/273 |
| 5,113,349 | 5/1992 | Nakamura et al. | 364/478 |
| 5,119,305 | 6/1992 | Ferro | 364/460 |

*Primary Examiner*—Thomas G. Black
*Attorney, Agent, or Firm*—Aquilino & Welsh

[57] ABSTRACT

A digital computer based power control system for automatically aligning a first, moveable object with a second, fixed object to aid a human operator in effecting contact or engagement of the first object with the second object in a precise manner. A camera and light assembly on the first object form images of the second object as the first object is automatically positioned. These images are stored in digital form and compared to an ideal image which indicated proper alignment of the first and second objects. This condition is indicated to the human operator to allow movement of the first object to the point of proper alignment. The system includes a main processor, a ROM for storage of control programs, RAM for storage of images, a camera and light assembly, operator controls, and power electronics. A typical application of the power control system is a forklift controller for automatically aligning the forks with a pallet to aid the operator in engaging the forklift truck with the pallet in a precise manner.

13 Claims, 9 Drawing Sheets

FORKLIFT ALIGNMENT SYSTEM

BACKGROUND OF THE INVENTION

The invention relates to a system for aiding a forklift truck operator in aligning the forks on the truck with a pallet to eliminate or minimize damage of the pallet.

In the warehouse and shipping industries, pallet damage from fork trucks is a major and costly concern. Motorized forklifts are the principal means of moving industrial products, and are also the principal cause of damage to products and especially to the pallets upon which the products are placed. This damage occurs because forklift operators do not have visual access to the target area for the forks.

The known prior art relative to this technology is represented by U.S. Pat. Nos. 4,279,328, 4,678,329, 4,604,025, 3,854,820, 3,854,820, 4,566,032, 3,700,907, 4,549,845, and 4,724,480.

U.S. Pat. No. 4,678,329 is directed to a navigation system for movement of a vehicle to the vicinity of a pallet and does not describe the operation of the vehicle at the pallet. The system appears to be an autonomous system set up to navigate the vehicle without operator aid and without movement of the forks.

U.S. Pat. No. 4,279,328 relates to a forklift truck orientation system based on a remote controlled vehicle guided, for example, by a wire in the floor for precise handling orientation such as in robotic systems.

U.S. Pat. No. 4,604,025 discloses a "line of sight" aid for an operator of a "mobile material handling machine"; electronics or an imaging system are not included in the description.

U.S. Pat. No. 3,854,820 (Re. 29,025) relates to a light referencing system including a light source used to generate a collimated beam of light and converting and projecting the same as a relatively intense fan-shaped or diverging plane of light from an operator manipulatable device on a machine or vehicle to an object, such as a pallet. The system includes no imaging or electronics.

U.S. Pat. No. 4,566,032 discloses an unmanned vehicle which is optically guided. A guide belt laid on the floor guides the vehicle. A vehicle camera receives light reflected from the guide belt.

U.S. Pat. No. 3,700,907 describes a very complex optically-based system for identifying an object or the identification of the contents of a moving or stationary object.

U.S. Pat. No. 4,549,845 concerns the special modification of a material handling vehicle to handle and/or manipulate drums.

U.S. Pat. No. 4,724,480 uses a light pattern projected from a first object onto a second object, and an image of the pattern of light on the second object is recorded with a camera mounted on the first object. This system appears to be applicable to a robot end effector and uses circles of light to determine distance and orientation.

SUMMARY OF THE INVENTION

The present invention is a system for aiding a forklift truck operator to align the forks on the truck with a pallet. The system operates when the vehicle is in the vicinity of the pallet by automatically moving the forks into alignment with the pallet and thereafter returning control of the forklift truck to a manual mode to permit movement of the vehicle by the operator.

The invention uses a computer operated system having programs which control the optical imaging of a pallet in positional relationship to a forklift. An ideal image representing the image which should be recorded by a camera/light device mounted on the forklift when the forklift and the pallet are in an ideal relative position is stored in a random access memory (RAM). Subsequently, a series of images of a pallet are taken by the camera/light device and the images are stored in the (RAM). A comparison of the series of images taken as the forklift is being positioned with the ideal image takes place until an equal condition indicates that the forklift has reached the ideal position. This condition is displayed to the forklift operator to allow movement of the forklift to the pallet with minimal or no damage. Movement of the forklift can be either under automatic or manual control based on the mode selection at the operator panel.

It is an object of the invention to provide a system for orienting a forklift to a pallet. It is another object of the invention to supply information to a forklift operator relative to the orientation of a forklift and a pallet. It is yet another object of the invention to assist an operator in moving a forklift into proper position to engage a pallet with minimal pallet damage.

These and other objects will become apparent from the following specification and drawings.

DESCRIPTION OF THE PREFERRED EMBODIMENTS

The forklift alignment system of the present invention includes a combination of automatic and manual controls in the alignment and movement of a pallet loaded with goods in a warehouse environment. The proposed system is intended to be applied to a forklift of the type that is normally controlled by a human operator, and is used for the purpose of moving palleted goods in and out of and around a warehouse, and loading or unloading a parked vehicle. The system is capable of being attached to an existing forklift as a retrofit or can be integrated as a part of the original equipment. The system provides an automatic means to control or manipulate the forks on a forklift so as to align them with a pallet to aid the human operator to subsequently effect proper handling of the pallet. Following automatic alignment by the system of the present invention, the operator can insert the forks into the pallet, lift the pallet and its load, and maintain the load in a stable manner with minimum damage to the pallet and its load.

Figure 1:
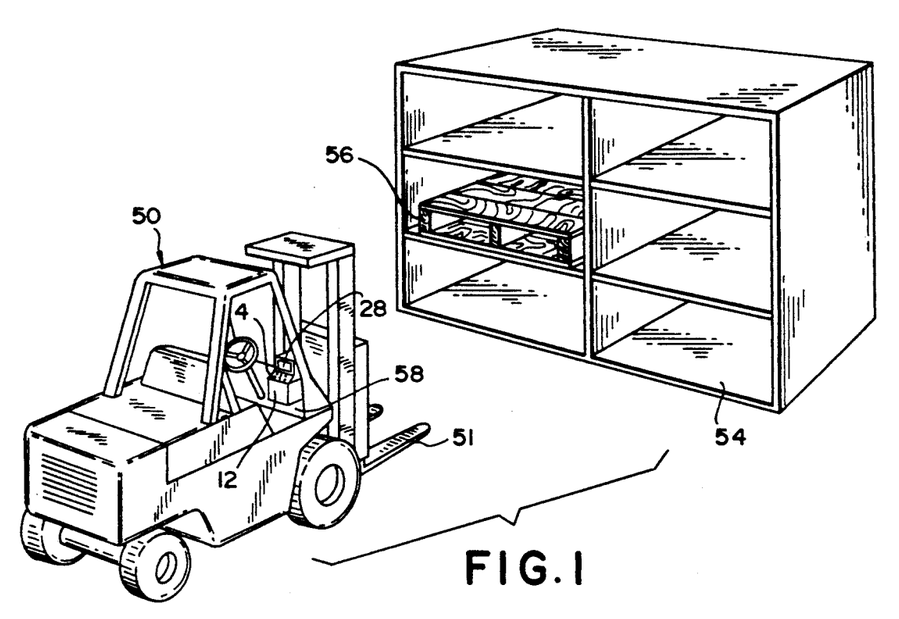
FIG. 1 is a schematic view of the complete forklift alignment system including the physical relationship of the forklift, truck and its alignment equipment and the pallet.
Figure 1A:
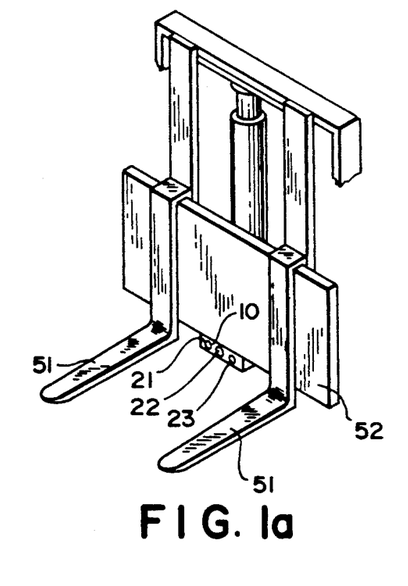
FIG. 1a is a view of the forklift and elevator portion of the forklift truck of FIG. 1.
Figure 1B:
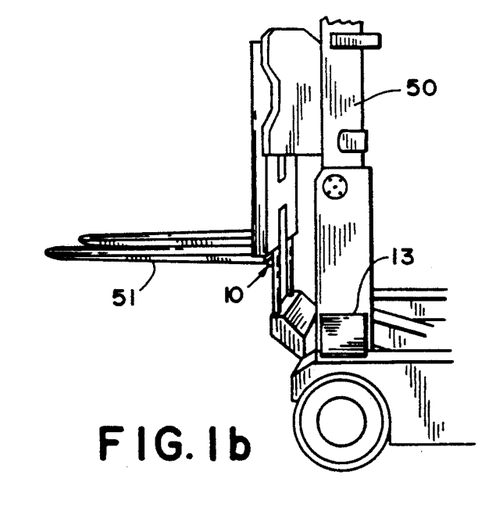
FIG. 1b is a side view of the forklift and elevator portion of the forklift truck of FIG. 1.

Referring to FIG. 1, a forklift truck (50), having a pair of hydraulically operated forks (51) on a forklift elevator 52, is positioned adjacent a storage rack (54) having load mounting pallets (56). Only one pallet (56) is shown but it will be appreciated there would normally be a large inventory of pallets and goods in each storage rack (54). The overall system consists of four major components or assemblies including the camera and light assembly (10), an image processor (25) a hydraulics control module (13), and a control/status unit (12) for the operator. The control/status unit (12), having a display panel (4) and a T.V. monitor (28) is conveniently mounted on the dash board (58) in easy view and reach of the operator. The camera and light assembly (10) is mounted on the forklift elevator 52 as shown in FIG. 1a. The hydraulic control (13) which positions the forklift elevator (52) as described hereinbelow, is mounted on the forklift truck (50) as shown in FIG. 1b.

Figure 2:
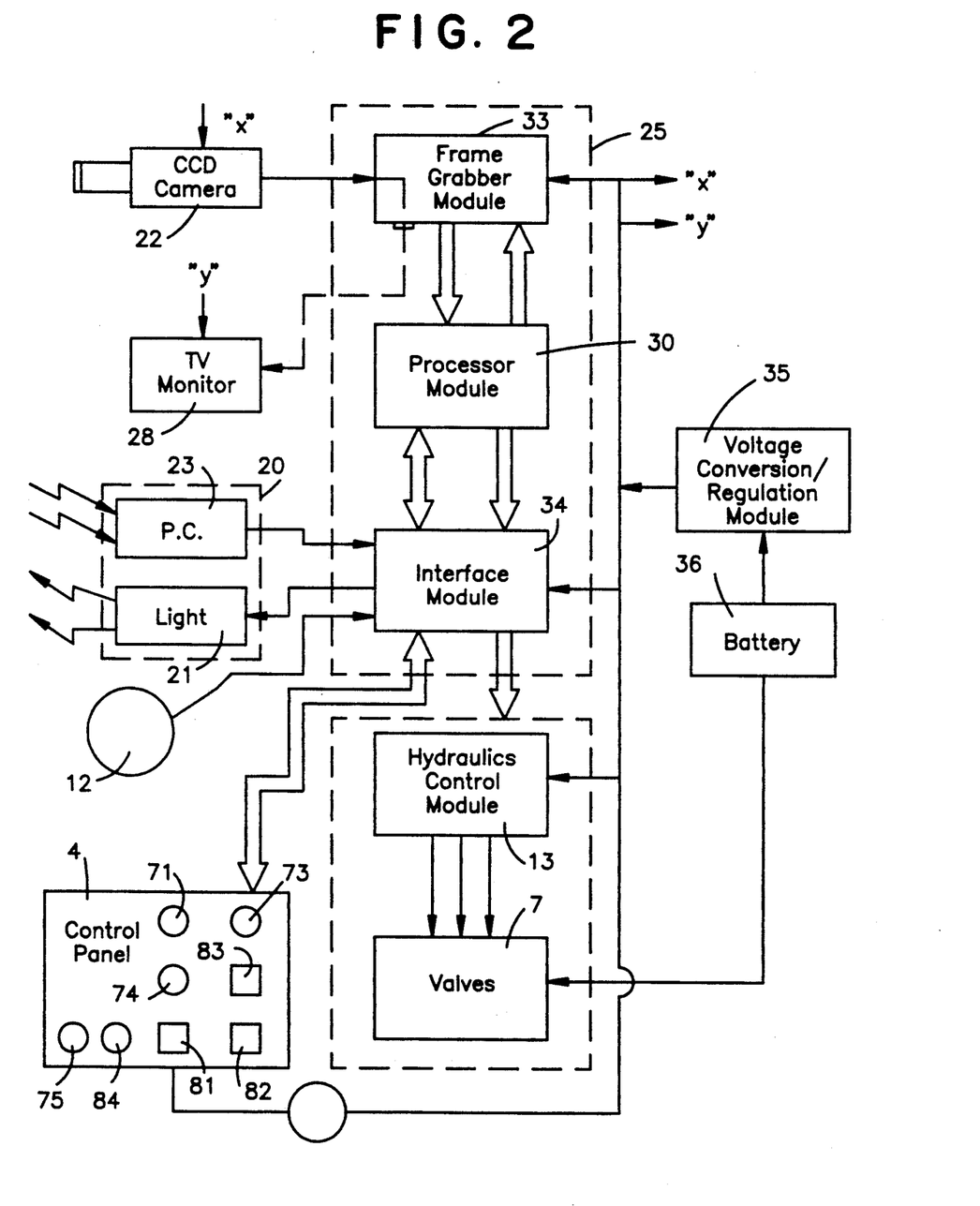
FIG. 2 is a block diagram of the electronic controls of the present invention.
Figure 3:
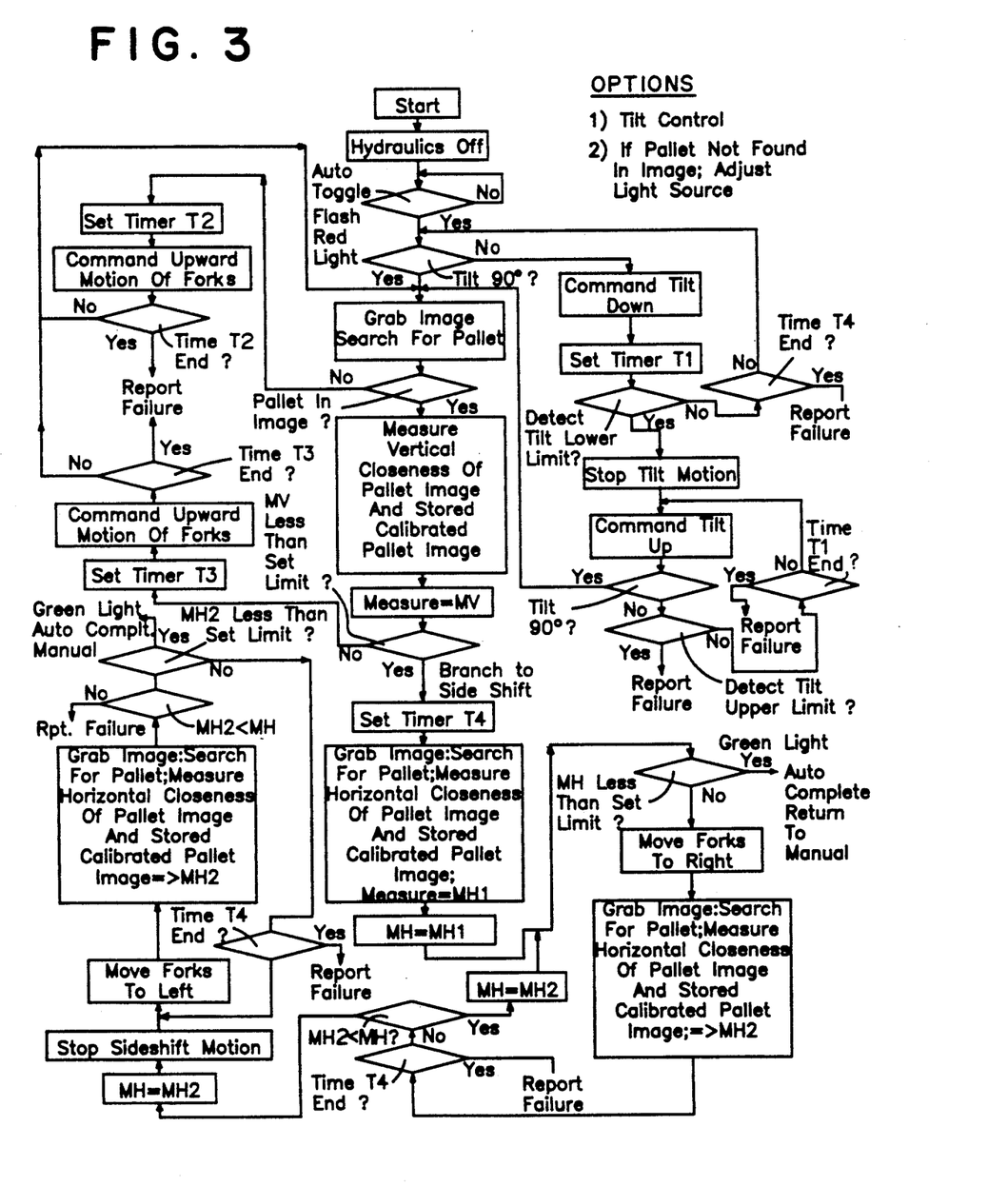
FIG. 3 is a logic flow chart of the software controls of the present invention.

Referring to FIG. 2, the electronic controls block diagram includes: a CCD camera (22), a frame grabber (33), a processor (32), an interface module (34), a hydraulic control module (13), a photocell/light source intensity control (20) and the operator control unit (12).

The camera and light assembly (10), which is mounted on the forklift elevator 52, includes a camera (22), a single light source (21) located above the camera, and a photosensor (23) to sense the intensity of ambient light. This camera and light assembly (12) moves with the elevator 52 in a manner so as not to interfere with the normal required motion of the forks (51). When the forks (51) are parallel and in contact with a ground surface that supports the forklift vehicle (50), the camera angle, which is fixed, is such that the image acquired by the camera (22) will show the pallet to be in an image frame but located "somewhat" above a horizontal line which is centered in the vertical direction.

Camera: The camera (22) used in this application is a standard video camera (vidicon or CCD) with an appropriate lens. A suitable lens is similar in function to a "C" mount lens with approximately a 10 mm focal length and an aperture corresponding to f 3.5 or better. The camera (22) should be sensitive down to 20 lux or lower to produce a visually acceptable image. Resolution is 120 pixels (h) by 180 pixels (V) or better. This camera outputs a standard NTSC black and white signal (RS 170). Power is taken from a 12 volt source. Lens depth of field is 0.5 meter to $\infty$, or better.

Light Source: The light source (21) is of the quartz-halogen type (12 volts) to provide sufficient light for the camera to produce an acceptable image. The beam which targets the pallet is round with a diameter of 15-20 cm. at a distance of 2 meters. This light source (21) is mounted on a bracket just above the camera and moves with it and for the purpose of illustration it is shown as an integral part of the camera and light assembly (10) in FIG. 1.

Photocell: A shielded photocell (23), also shown on the camera and light assembly (10), is pointed upward and is shielded from other light sources by a shade tube (not shown). The photocell (23) is a two wire device consisting of either a phototransistor or a photo conductive cell, which senses ambient overhead light intensity for the purpose of adjusting the intensity of the mobile light source (21) to maintain an acceptable image contrast.

Image Processor: The image processor (25) is an "electronic box" consisting of several PC modules interconnected through a backplane and interfaced to the camera.

Figure 7:
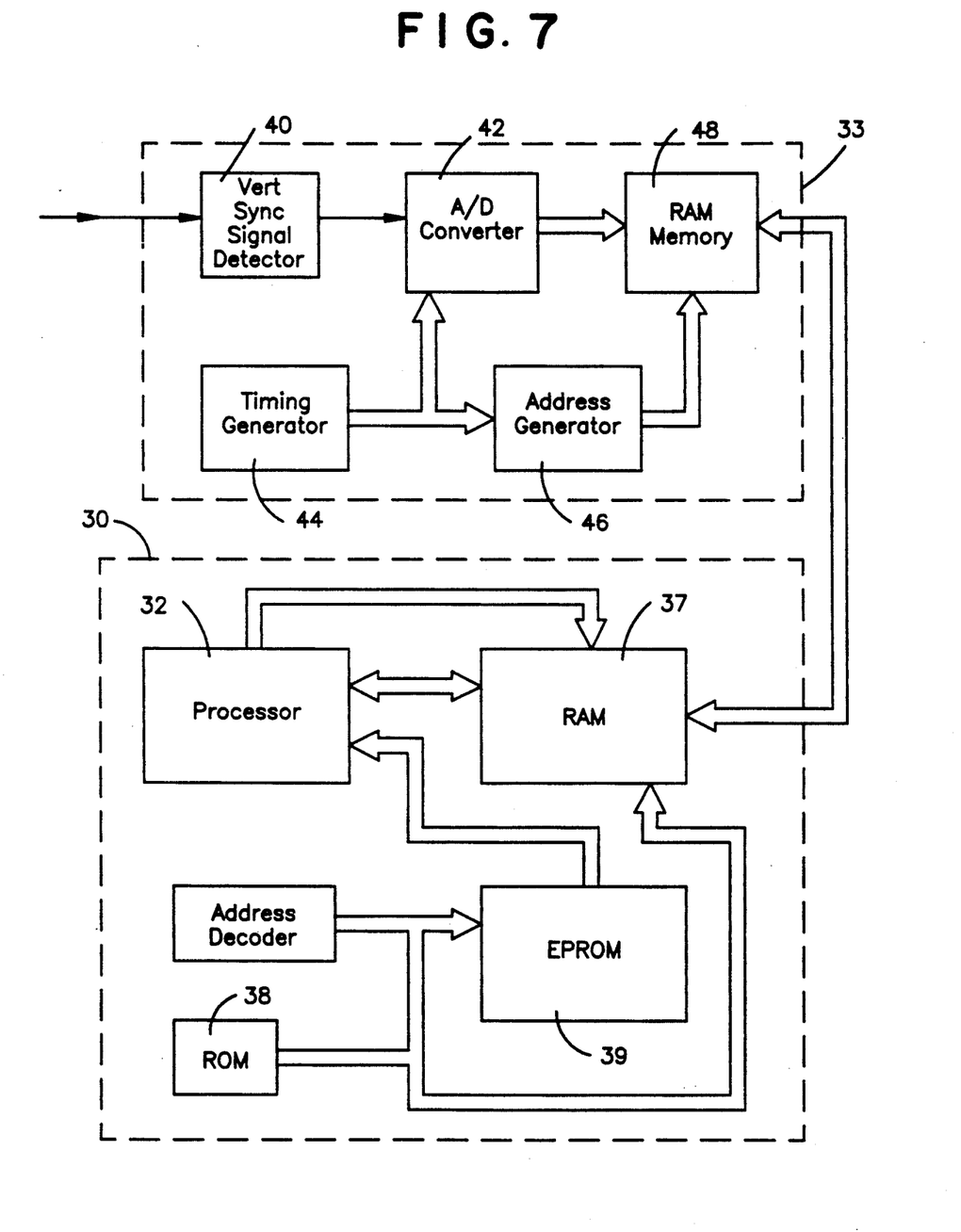
FIG. 7 is a block diagram of the frame grabber and processor board of the present invention.

Processor Module: Referring to FIG. 7, the processor module (30), which performs several key functions, consists of a main processor (microcontroller) 32, a read-only memory ROM (38) for stored programs, a random access memory RAM (37) for temporary storage of images and intermediate results, timers and other special devices to implement data transfer and addressing. The ROM (38) contains the program firmware to process images, initiate and set control signals and control timing signals. During the calibration phase, the calibration image is stored in an electrically programmable ROM, EPROM (39), which is also on the processor module (30). Upon receiving a signal from the operator control and display panel (4), the processor (32) initiates and stores an image frame. As the forklift forks (51) move upward, an image frame acquisition is initiated and an analysis and comparison with a stored (calibration) image is made. Then, based on the comparison, the forks continue to move or stop if a comparison is made. The processor (32) applies this same procedure to align the forks (51) in the lateral direction. As an option, the tilt angle of the forks (51) may be controlled. In addition, the processor module (30) uses signals from the photocell (23) to control the intensity of the light source (21). The processor (32) also handles signals to and from the operator control and display panel (4).

Figure 5:
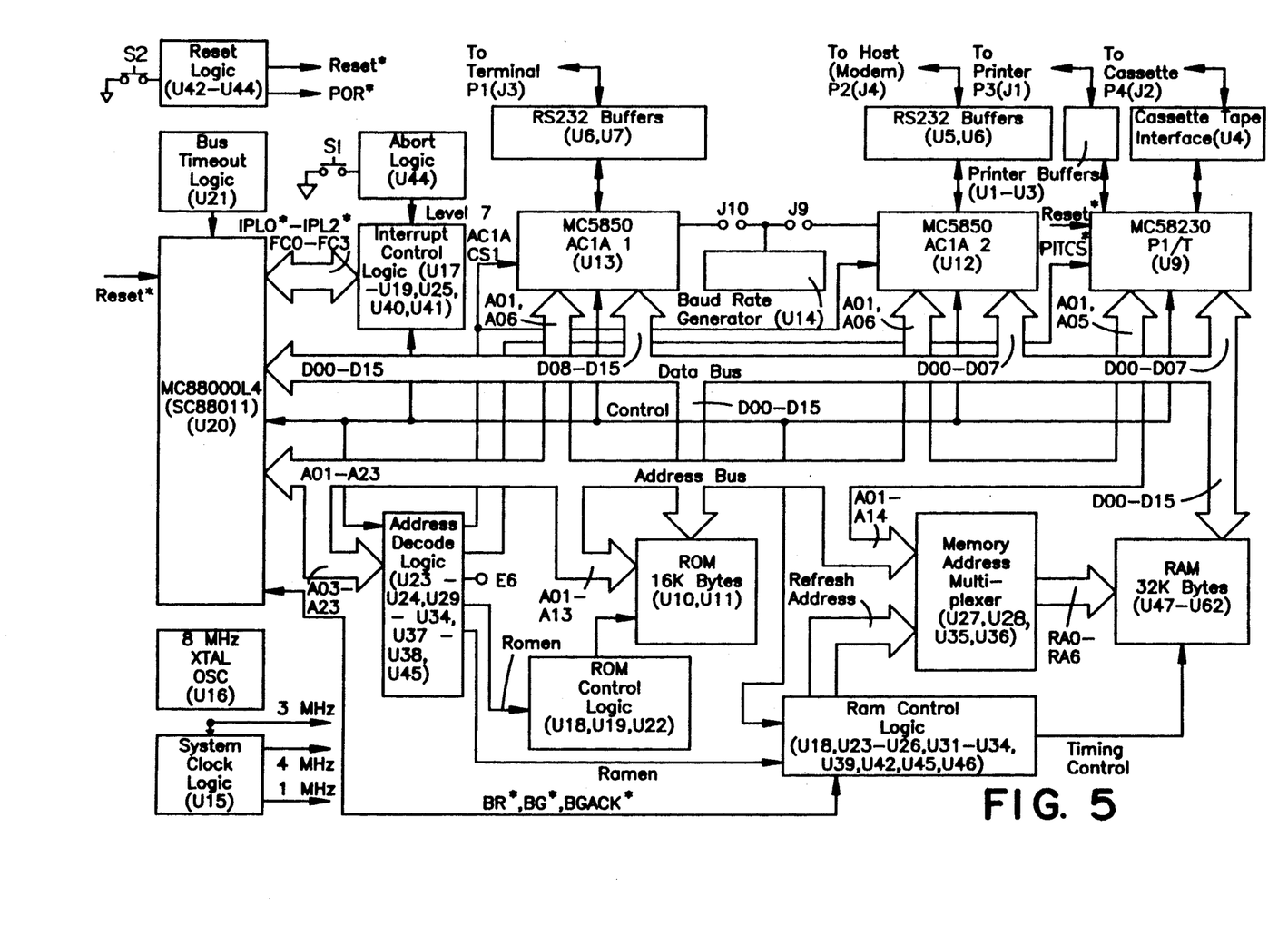
FIG. 5 is a block diagram of a processor board used with the present invention.

A detailed block diagram of a sample processor board is shown in FIG. 5. The major components on this board are the CPU (or a microcontroller), RAM, EPROM and I/O devices. These devices, along with additional support devices, constitute a standard basic single-board microcomputer (SBC). This basic structure has been well-defined for over 15 years, and its structure is well-known to students in Electrical Engineering and Computer Engineering programs. Components on this board are interconnected through bus structures. The bus structure consists of a data bus (bidirectional) to transfer data/instructions between the CPU and memory. The CPU controls data flow and executes instructions. The RAM stores the images transferred from the frame grabber for processing, stores the processed images (until the next image is ready for processing), stores the parameters of the calibration image and the parameters calculated from the processed images one at a time. The EPROM stores the program to be executed that directs the processing of an image, compares calibration and calculated image location parameters, generates control signals for driving the hydraulic valves (7), and controls data/information transfer between major system blocks. The I/O devices serve as controllable buffers between the CPU and off-board functions, including interfacing functions and the operator control panel.

Image Acquisition (Frame Grabber Module): A detailed block diagram of the frame grabber module (33) is shown in FIG. 7. The image acquisition, frame grabber module (33), under control of the processor (32), examines the signal coming in from the camera (22), converts this analog signal from the camera (22) over one complete frame (33 millisec) to digital form using 2-6 bits per pixel and stores the resulting digital image in frame RAM memory (48). The technology of accomplishing this task is well established and requires less than 150 square centimeters of board space.

The input to the frame grabber module (33) is a standard RS-170 (NTSC) BW composite analog TV signal. The frame grabber module (33), on command from the processor module, will convert the analog signal record representing a video frame to digital form. This is accomplished using a vertical sync signal detector (40) and a high-speed analog-to-digital A/D converter (42). A timing generator (44) and address generator (46) control the output of the D/A converter (42) to the memory (48). The digital form is a stream of binary words which are stored in a data file on the frame grabber. On command, this data file can be transferred to the RAM memory (48) of the processor board.

Figure 6:
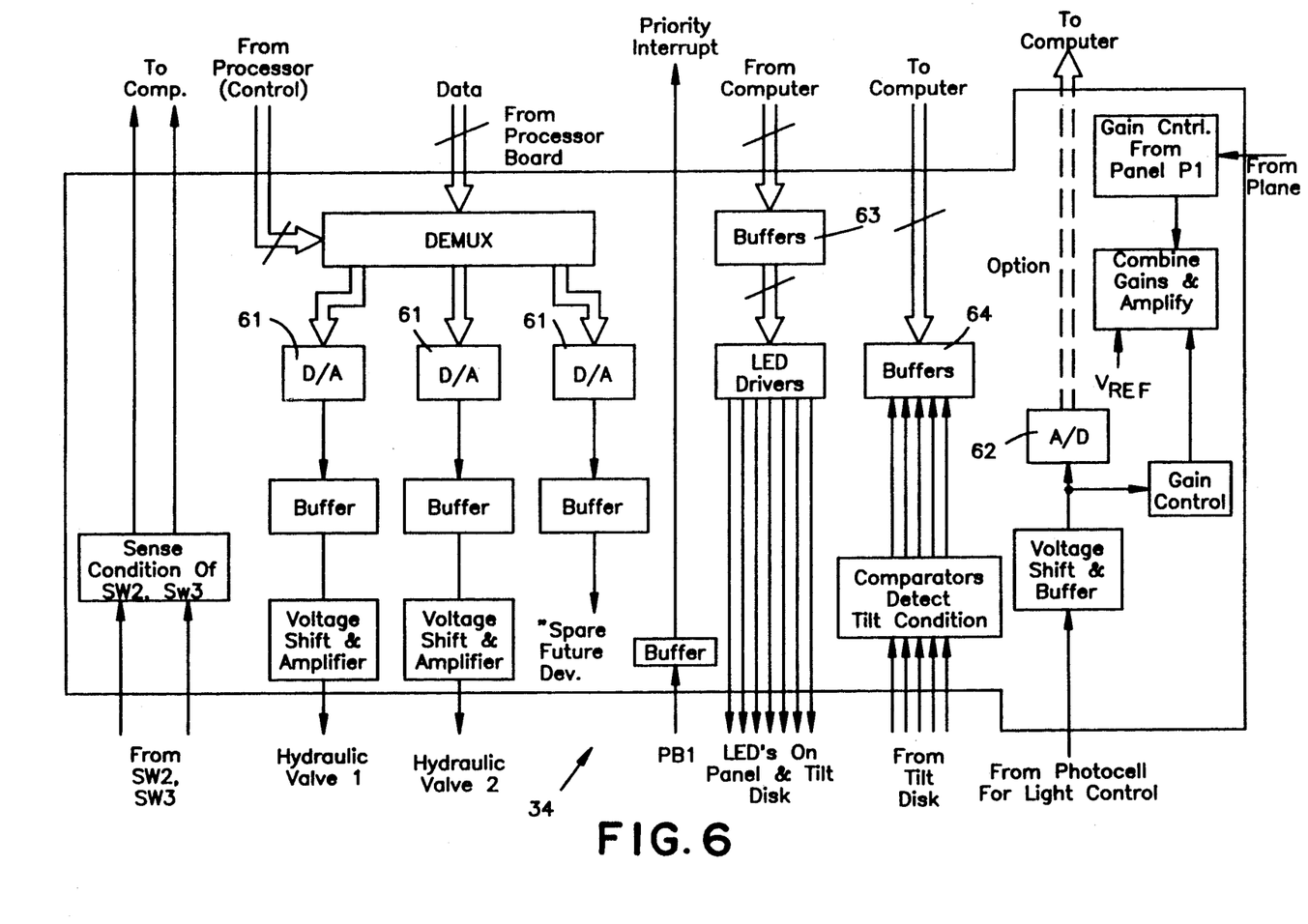
FIG. 6 is a block diagram of an interface module used with the present invention.

Interface Module: Referring to FIG. 6, the interface module (34) interfaces the processor board with the control functions and with devices outside of the Image Processor and Fork Control Assembly. Control signals which are generated as a result of implementing processor functions by the processor module (30) are conditioned by the interface module (34). Signal conditioning consists of level shifting and signal isolation (for protection) and other necessary functions to prepare the control signals for application to the final control elements. Also, signals to or from external devices such as the operator control and display panel (4) are handled by the interface module. The photocell signal and the signal from the tilt indicator options are interfaced via the interface board. For the external devices, the interface module (34) generates the required interrupt signals for the processor module (30). In addition, the interface module (34) interfaces the processor module (30) with operator commands during the calibration procedure with a parallel or serial port; it permits transfer of image records collected during the pallet handling operations, such as results from reading and storing bar code information for the pallets moved.

Interfacing Functions: Referring to FIG. 6, the interfacing module (34) provides a variety of functions relevant to input and output operations to and from the processor module (30). These functions include the following: Digital-to-analog conversion devices (DAC) (61); Such a device accepts a binary word from the processor board via the I/O device. These binary words are then converted to a sequence of analog voltages—a piece-wise constant output. One such output provides a variable analog voltage to drive the light source. Another such voltage serves as input to the hydraulic control module (13). The interface module (34) also contains a "low-level" A/D converter (62) to convert the photocell measurements to binary form before transfer to the processor (32). The interface module (34) also contains buffering devices (63 & 64), which provide load isolation, voltage-level shifting, and voltage-to-current conversion to drive the LED's. Finally, the interfacing module (34) includes a 4-bit resolution analog to digital converter to control the speed of motion, if needed, and the intensity of the light source.

Figure 4:
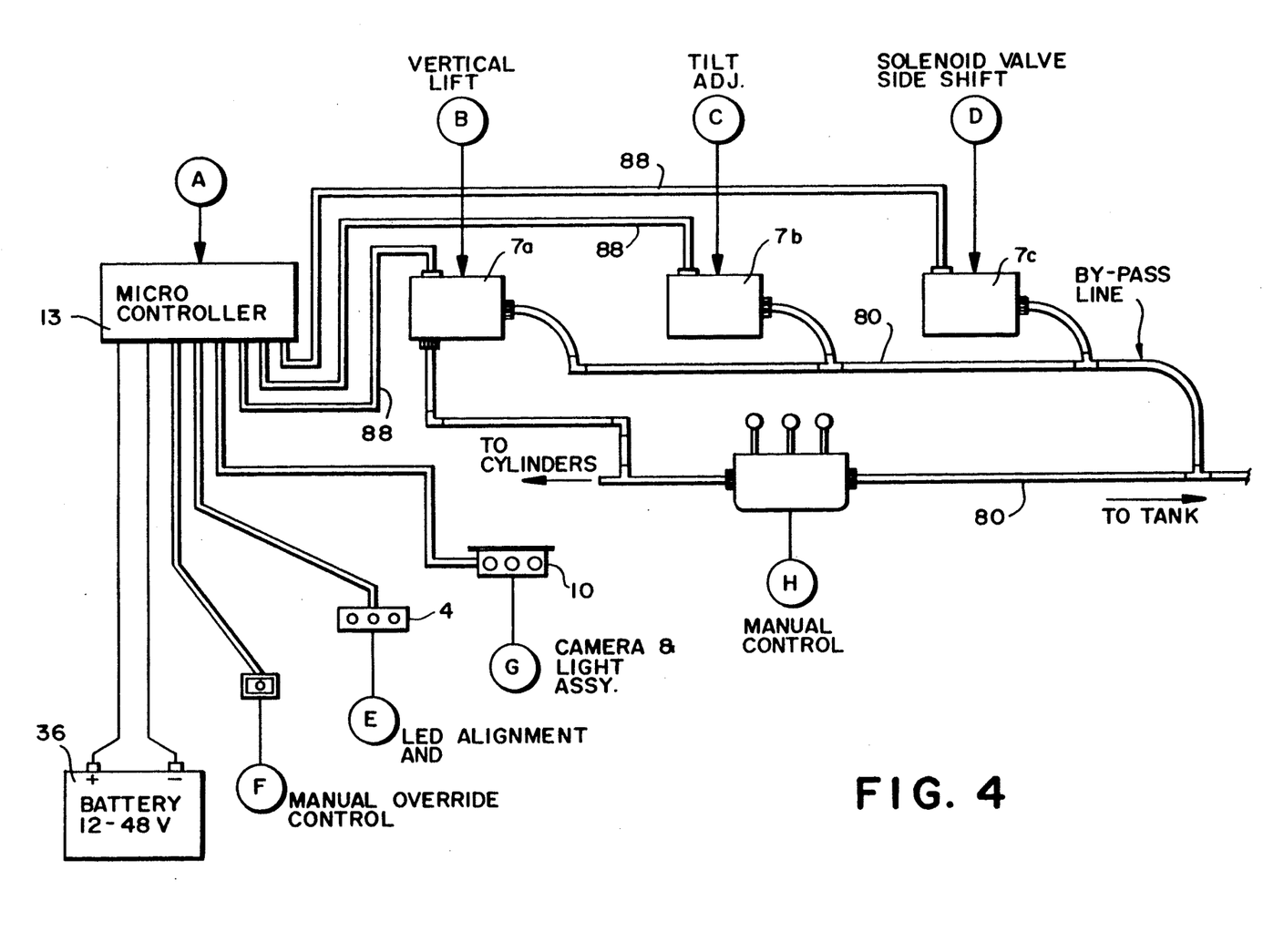
FIG. 4 is a diagram of the hydraulic system controls for automatic control of the forklift.
Figure 8:
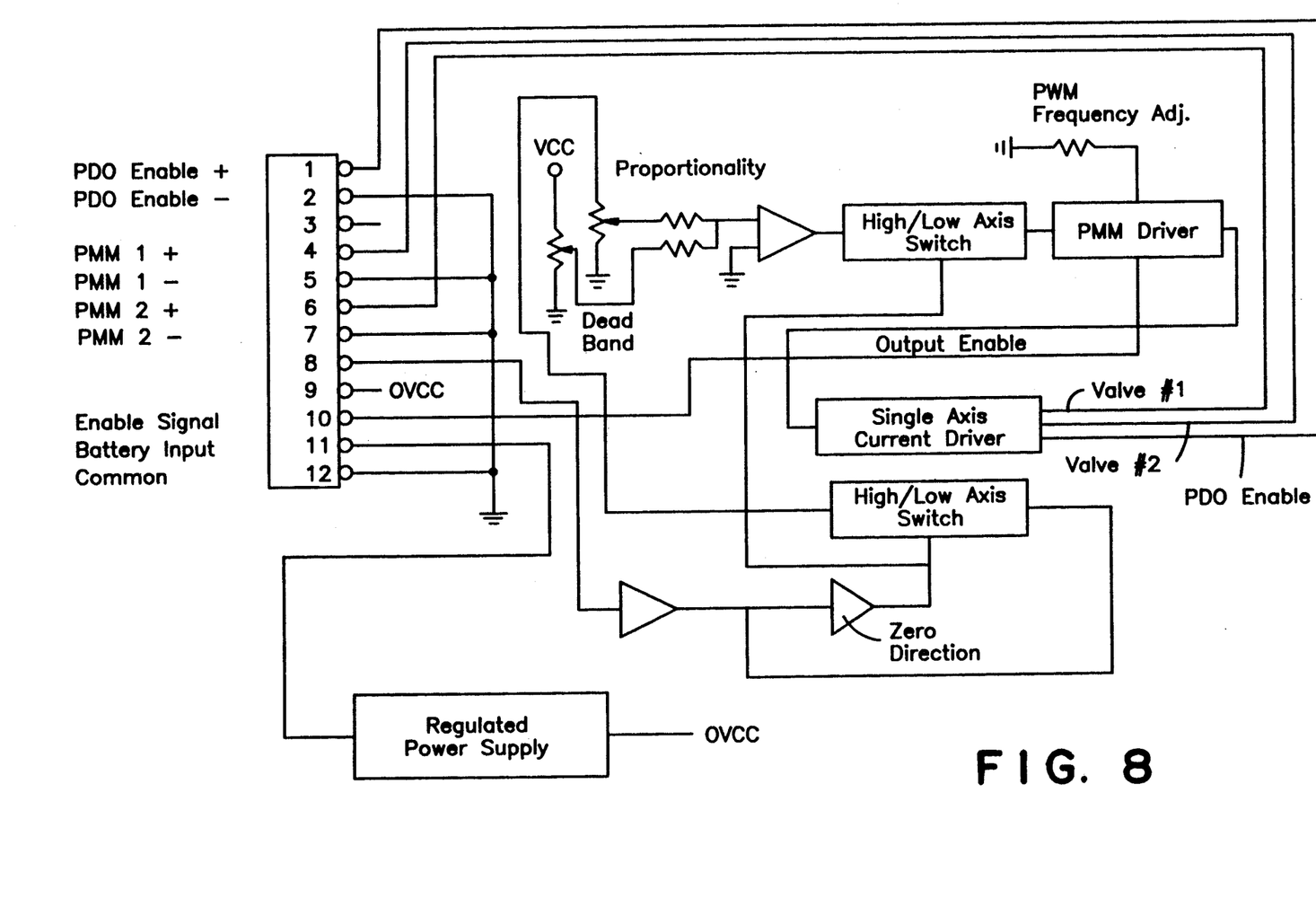
FIG. 8 is a schematic diagram of a hydraulic control board used with the present invention.

Hydraulics Control: As illustrated in FIG. 4, the hydraulics control includes a series of operational valves (7), including a vertical light valve (7a), a tilt adjustment valve (7b) and a lateral shift valve (7c). These valves (7) are connected by means of hydraulic lines (80) between a hydraulic fluid supply tank (not shown) and suitable cylinder actuators to move the forklift elevator (52) and the forks (51). The valves (7) are operated by signals from the hydraulics control module (13) through suitable electrical connections (88). The hydraulic control module (13) is connected to the camera and light assembly (10) and the display/control panel (4) as described hereinabove. The hydraulics control module (13) contains the electronic devices necessary to match the low power, low signal level control signals produced by the interface module (34) to higher current, higher power levels required by the hydraulic valves (7) controlling the vertical, horizontal, or tilt motions. These devices consist of transistors in a switching or amplifier mode or SCR's FIG. 8 shows an example of a hydraulic control module. The input is an analog voltage from the interface module (34). The hydraulic control module (13) generates a PWM (pulse-width modulation) signal to control the flow rate for the fluid driving the hydraulic actuators. The hydraulic actuators, in turn, control the vertical and horizontal motions of the lift forks.

Voltage Conversion and Regulation Module: Referring to FIG. 2, the voltage conversion and regulation module (35) has its input from the main electrical storage cell battery (36). Its function is to produce regulated voltages as required by the other PC boards at the required current levels. These voltages are commonly +12 volts (10 amps maximum), −12 volts (0.25 amp. maximum), +5 volts (4 amps, maximum), and −5 volts (0.100 amps, maximum).

Operator control and Display Unit: The operator control and display unit (4) is located at a convenient place on the forklift vehicle (50) for control and monitoring by the human operator, as shown in FIG. 1. Among its functions, the unit (4) indicates that the forklift truck (50) is operating in the manual mode in which the operator can control the forklift truck in a normal fashion. After the operator initiates the automatic, hands-off mode by using a master switch (81), the unit (4) will indicate that the automatic mode has been entered. A "panic" switch (button) (75) returns the fork lift control to the manual operator mode. However, if not overridden, when the alignment procedure is successfully completed, the operator panel indicates this completion, and that the operator can now proceed with fork insertion.

Figure 9:
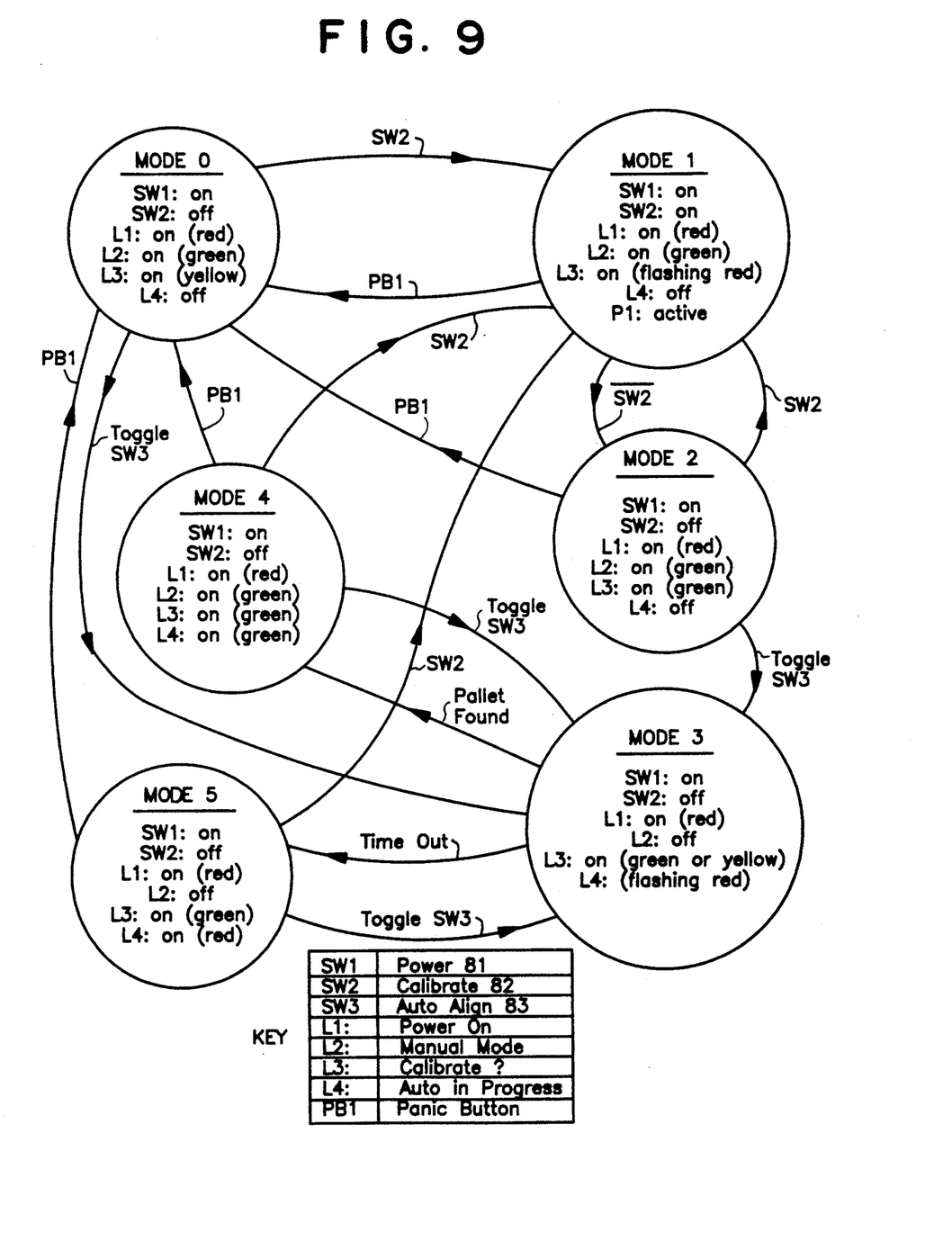
FIG. 9 is a state transition diagram of the logic and operation of the operator control panel.

FIG. 9 shows a state transition diagram that represents the logic and operation of the operator control panel. The operator control panel consists of a number of lights to indicate the status of the overall operation and switches to change states.

The master switch (81) turns on or off the electronics for the automatic alignment procedure. With switch (81) off, the system is in manual operation and all pallet electronics are off. If switch (81) is on, the system is still in manual mode but the electronics are now active. This is mode or state 0.

Calibration switch (82) is normally off. When switched to the on position, the calibration mode is entered. The system is still in manual mode. During calibration, as has been previously indicated, a T.V. monitor (28) is connected to the camera (22) to display an image of the pallet (56) as seen by the forklift vehicle (50) after having been "ideally" aligned with the pallet (56) by the operator. At this point, a potentiometer (not shown) is used to adjust the light source mounted on the forklift (51) so as to yield an acceptable image of the pallet (56) in the judgment of the operator. In addition, this calibration mode allows for a minor adjustment of the pointing angle of the camera to "optimize" the position of the pallet image in the overall image on the monitor. With the pallet image position and lighting adjusted, the calibration switch (82) is closed, which then captures the image, temporarily stores it, and then, processes it to extract and store the location parameters for this calibration image. These parameters remain stored until replaced when the calibration mode is re-entered. After the location parameters are generated, as indicated by a light, the system enters the next mode or state. Manual mode 0 can be returned to by activating panic button (75).

Mode 2 is entered after calibration. The forklift is now in manual mode. One can return to mode 0 by activating panic button (75).

Automatic/manual switch (83) is a toggle switch and when toggled, the system enters the automatic mode in which the forks and camera system are moved upward first, and then in the lateral direction. As this motion evolves, the alignment system is acquiring images, temporarily storing each one in succession, and processing each one to extract location parameters to compare with those for the calibration image. This is mode or state 3. When the automatic procedure associated with mode 3 is successfully completed, mode or state 4 is entered. Activation of the calibration switch (82) will return the system to mode 1 for recalibration. If a match between the current image location parameters and those of the calibrated image is not found within a pre-determined time length as determined by a timer which is started when state 3 is entered and is reset when the system leaves this mode, then the system enters mode 5 to report failure. Mode or state 3 can also be entered directly from mode 0; however, the previous location parameters for the calibration image will apply.

If the system enters mode 5, it means that it has failed to match the current and calibration image parameters. From this mode 5, the ground state, calibration mode or automatic alignment mode can be re-entered by activating panic button (75), calibration switch (82) or the automatic/manual switch (83), respectively.

Mode 4 is entered following the successful alignment of the forks (51) with the pallet (56). Manual control is restored. From this mode 4, the ground state, calibration mode or automatic alignment mode can be re-entered by activating panic button (75), calibration switch (82) or automatic/manual switch (83), respectively.

An optional mode may be provided. As the operator moves the forklift forward to engage the pallet, as an option, the operator activates a Universal Product Code "UPC" mode. In this mode, as the forklift approaches the pallet, the imaging system is used to scan a UPC symbol displayed in a predefined position on the pallet. The result of the scan is then stored in RAM (37) for later use.

(3) Other options may be provided using appropriate switches on the control status unit (12) which allow the operator to repeat upward vertical alignment, horizontal alignment or tilt control as individual procedures.

Another option allows the operator to activate imaging and storing a UPC symbol.

Display lights (71) and (73) are provided on the display panel (4) to indicate to the operator the condition of the controls of the forklift truck (50). A manual operation light (71) is green and is lit when the forklift is in the manual operation mode. An automatic mode light (73) is red and flashes when the automatic mode is in progress the green light (71) is off at this time.

A momentary flashing green manual operation light (71), with the red light off, followed by steady green light signifies the alignment procedure is completed, and the manual mode is ready.

Calibration Procedures

These procedures are performed at the beginning of a period during which it is expected that the forklift will be used for the same class of pallets and under approximately the same ambient conditions. Calibration is repeated as necessary; normally, these procedures need to be repeated only for changes in pallet size or shape.

A skilled operator maneuvers a forklift truck to within 5-8 feet from a typical pallet of the type to be lifted. The pallet lies on the same surface as the forklift. The alignment involves three axes. For illustration purposes, consider the forklift vehicle to be represented as a rectangular parallepiped (internal angles are right angles). The forklift part is an L-shaped bracket with one right angle between the plane of the forks and the plane of attachment to the front plane of the vehicle facing the pallet. When the plane of attachment is parallel to this front plane, the plane of the forks makes a 90° angle with this front plane. The plane of the forks is parallel to the plane upon which the forklift truck rests. Under these conditions, the tilt angle is 90°. The manual alignment procedure consists of setting the tilt angle to 90°, then setting the forks on the floor plane and raising them until they are centered with respect to the space between horizontal inside edges of the pallet side facing the forklift, and then adjusting the lateral position of the forklift so as to center the center vertical post on the pallet facing the forklift between the forks. This manual alignment would be considered to be ideal in that if the operator proceeded to move the vehicle straight ahead and insert the forks under the top surface of the pallet, a stable or balanced pickup procedure would be effected with no damage to the pallet or its contents.

After this manual alignment, with the forklift truck still located from 5-8 feet away, a small black and white monitor is connected to a matching connector on the Image Processing and Fork Control Assembly to monitor the output of the camera directly. Minor adjustments are made to adjust the position of the single light source so that it forms a spot that is centered symmetrically around the center post of the pallet. Then, a potentiometer accessible on the operator control panel is varied until the monitor displays an acceptable image to the human eye in terms of brightness and contrast. Finally, a switch on this same panel is used to effect capture of that image and store its digital form in the electrically alterable programmable read-only memory EAPROM. This completes the calibration procedure. The automatic switch on the Operator Control and Display Panel is used to reset the system for automatic operation.

The calibration of the system may be summarized by the following steps:
  (a) the distance from the pallet to front of the forklift is set at approximately 6-8 feet,
  (b) the forklift truck heading is established straight ahead relative to pallet or 0° heading relative to pallet;
  (c) the forks are separated approximately 15 to 30 inches based on pallet size;
  (d) the tilt of forks is set at 90°;
  (e) a lateral positioning for symmetrical placement relative to center post of pallet is performed; and (f) a vertical positioning of the center forks relative to the space between the top and bottom planes of the pallet is performed.

The calibration procedure is initiated from the operator control panel. A portable "standard" television monitor is connected to the image analysis and control box during calibration; the television camera is now directly connected to the display monitor and the frame grabber.

The light source, camera position (minor tilt adjustment), and camera lens (f-number and range adjustments, if present) are adjusted to achieve an acceptable or "ideal" image of the pallet.

A "calibration image capture" button (84) on the operator control panel is activated (this button is active only during the calibration procedure). The result is that the "ideal" image is captured, analyzed and position parameters are stored in the processor in the image analysis and control box. The calibration switch (82) on the operator control panel is moved from the calibrate position back to the operate position. The monitor connection is removed from the image analysis and control box. The system is now calibrated.

Calibration Image: Automatic alignment is accomplished by comparing location parameters of a particular image captured during the alignment procedure and the same location parameters for the calibration image. Assume that the overall system has been installed on a forklift. Before it is actually used in a particular application, the forklift operator drives the forklift to position it about 5-8 feet directly in front of a (floor) pallet. The horizontal and vertical positions of the forks (and tilt) are adjusted so that, in the judgment of the operator, the alignment with the pallet is ideal. That is, if the forklift were driven straight forward, the forks would engage the spaces between the upper and lower surfaces of the pallet and would symmetrically stride the center post of the pallet. This image (monitored by a small portable B/W monitor) is captured, as initiated from the operator control panel. The monitor is used to assist in selecting the "ideal" alignment and to select the light level for an acceptable contrast. This calibration image is then processed to produce location parameters, which are then stored. Also, the controlled light level can be set. That is, with the monitor connected, a control (potentiometer) on the operator control panel is rotated to select an acceptable light level based on a judgment of the monitor image contrast. Then, a switch is closed to place the selected light level under feedback control. This ends the calibration cycle. The monitor is disconnected from the system and set aside.

Operation Procedures (1) The operator maneuvers the forklift to a position 5-8 feet in front of a pallet and so that a vertical plane cutting the forklift vehicle model in half from the front plane to the rear plane is roughly aligned with the vertical center post of the pallet plane of interest. The front plane of the forklift vehicle is approximately parallel to the vertical side plane of interest on the pallet. The starting position of the fork plane is a few inches above the floor plane. The operator then sets the fork tilt to 90° (if required) manually or executes the automatic tilt control (not shown) from the control panel. The automatic tilt control includes an optical disk affixed to the camera and light assembly (10). An LED, matching photodetector and a corresponding small hole in the disk are setup so that when a 90° tilt angle is reached, the LED, hole and photodetector lineup, allowing this condition to be sensed by the Image Processor and Hydraulics Control Module. For a 5 cm diameter disk, the position resolution is better than ±1°. Two additional LED/photodetector combinations can be added around the periphery of the disk corresponding in position to tilt angle limits in order to compensate for the automatic tilt control procedure starting to look for the 90° position in the wrong direction. The control panel indicates when the 90° tilt angle is reached; the tilt control mode then halts.

(2) During the initial maneuvers, the operator also manually operates the forklift (50) in the lateral direction until the forks (51) are positioned approximately symmetrical about the vertical front to rear plane through the vehicle.

(3) Case 1: Target pallet lies on the floor. In this case, the operator manually sets the forks (51) to the floor and toggles the automatic vertical and horizontal position control routine from the control panel. The hydraulic control switches from manual to automatic.

(4) Case 2: Target pallet lies on a rack whose height is at least two feet above the floor plane. The operator manually operates the forklift upward until the fork plane reaches about two feet below the top surface or plane of the pallet. Then, the operator stops the upward motion and toggles the automatic vertical and horizontal position control routine from the control panel. Hydraulic control switches from manual to automatic.

(5) The automatic mode follows these steps as the forklift continues to move upward.

(a) The photocell (23) near the light source (21) adjusts the intensity of light giving a greater intensity from the on-board source as the ambient light intensity increases. This tends to retain constant contrast. There are preset upper and lower limits on the intensity level from the on-board light source.

(b) An image is captured and stored: it is processed to determine certain features; the algorithm looks for and defines the center point for the center post of the front side of the pallet and the open area of the pallet defined by the inner sides of the top and bottom pallet surfaces and the center post. The open area and location of the centroid of the center post of the pallet are used to match the stored ideal image with an image captured while performing the alignment procedure; the result of such a comparison is a measure of closeness. As the forks (51) move upward toward the object pallet (56), the image of the pallet appears to move into the raster from the top and move downward toward the center. The measure of closeness decreases; when this number becomes smaller than a preset level, the lift is commanded by the processor to stop the upward motion.

The processor (32) now activates the side shifting action; as the sideshift moves, an image is captured and matched against the stored image. The direction of lateral motion is determined from the comparison of the stored calibration and acquired images. If the match measure decreases, the shift continues to move and successive images are acquired and processed. When the match measure decreases below a preset threshold, the processor commands the side-shifting to stop. The automatic alignment procedure is completed and the control reverts to the manual mode, as indicated to the operator on the control panel.

Closeness Measurements

A. First, analyze image to locate the "sideways" H-shape of the pallet; this is based on size and shape analysis of the dark, interior areas of the pallet and the center post or support and the upper and lower edges of the side of the pallet to be approached by the forklift.

B. Closeness is measured by a comparison of the centroids of the dark areas and the center post or support between an acquired image and the stored calibration image.

If the measure in (d) above for horizontal closeness increases, the side-shifter is commanded to reverse directions. If the closeness measure decreases, the motion in the same direction is continued. When the closeness measure reaches a lower preset limit, the motion stops.

Alignment is declared. Manual operation resumes.

Racked Pallets (3) The operator initiates manual upward movement of the forks; this motion is continued until the forks are located approximately 2 feet below the floor of the rack upon which the target pallet rests. This distance is based on the judgement of the operator. At this adjudged distance, the operator stops the upward motion of the forks. The apparatus described in this document for alignment has focused on its application to aligning the forks of a forklift vehicle with a pallet. However, the apparatus is not limited to this particular application. The general idea is the automatic alignment of a first, moveable object with a second, fixed object by controlling the position of the first object, whenever the second object can be imaged. Another application involves the positioning of one section of pipe to align it with respect to a second section of pipe to engage the two in a connection. Another application is the control of a robot manipulator to position or align it with respect to an object for the purpose of grasping the object or performing operation on the object.

Those skilled in the art will recognize that the embodiment described in the specification may be altered and modified without departing from the spirit and scope of the invention defined in the accompanying claims.

I claim:

1. Apparatus for alignment of a forklift truck with a pallet including:
   a control system having a processor including first and second storages, a scanner assembly, controls for movement of forks on said forklift truck, an operator control unit;
   said first storage for storage of said pallet image when said pallet is in a selected ideal position with the forks of said forklift truck;
   said second storage for storage of successive images obtained by the scanning of said pallet by said scanner assembly while said forks of said forklift truck are automatically moved by said controls;
   said processor performing a compare function of said first and second storages as successive images are placed in said second storage;
   said processor generating a signal when an equal compare condition is obtained;
   said signal controlling said controls to stop movement of said forks;
   said signal also indicating to said operator control unit that said forks of said forklift truck are in said selected ideal position to engage said pallet.

2. The apparatus as in claim 1 wherein said controls are hydraulic and move said forks in either a horizontal or vertical direction under control of said control system.

3. The apparatus of claim 1 wherein said scanner assembly includes a camera, a light source and a frame grabber module.

4. The apparatus as in claim 3 wherein said frame grabber module includes an analog sampler, an analog to digital converter, and a frame grabber storage module which function to receive analog signals from said camera in a repetitive series, convert said repetitive series of analog signals to digital form and store the digital series in said frame grabber storage module.

5. The apparatus as in claim 4 wherein said frame grabber module transfers said digital series from said frame grabber storage module to said second storage in said processor.

6. The apparatus of claim 1 wherein said operator control unit includes:
   a manual/automatic switch;
   a display monitor for viewing the image of said pallet taken by said camera and light source
   a calibration switch which is used during a calibration procedure to store said selected ideal position of said pallet;
   an alignment indicator which indicates to the operator that the alignment of said forks is complete when said selected ideal position has been reached.

7. A method for calibrating a forklift control system to store the image of an ideal position of a pallet in relation to the forks of a forklift truck by the following steps:
   a) moving said forklift truck to face said pallet at a distance of approximately 7 feet from the front of the forklift truck to the pallet;
   b) viewing the pallet image on a display monitor connected to a camera on said forklift truck;
   c) adjusting said forks and said forklift truck to be in a position that if the forklift truck were moved directly forward the forks would engage the pallet in an ideal manner as judged by a trained operator;
   d) storing under control of a switch the pallet image shown on said display monitor which represents the ideal position into a video storage.

8. A method of operating a system for alignment of a forklift truck with a pallet including the following steps:
   a) calibrating said system to store an image of an ideal position for said pallet to be engaged by the forks of said forklift truck using a video monitor;
   b) moving said forklift truck in manual mode by an operator into an approximate position for engaging said pallet by said forks;
   c) switching said system from manual mode to automatic mode by said operator;
   d) moving said forks in automatic mode;
   e) scanning of said pallet during automatic mode to obtain a series of images of said pallet as said forks are moved;
   f) comparing said series of images of said pallet with said ideal position;
   stopping said forks when said ideal position has been reached as indicated by said comparing step;
   h) switching said system from automatic to manual mode by said operator; and
   i) moving said forklift truck by said operator to engage said pallet.

9. Apparatus for alignment of a first moveable object with a second fixed object including:
- a control system having a processor including first and second storages, a scanner assembly, a power control system for moving the first object, and operator controls;
- said first storage for storage of image of said first object when said second object is in a selected ideal position relative to the said first object;
- said second storage for storage of successive images obtaining by the scanning of said second object by said scanner assembly while said first object is automatically moved by said power control system;
- said processor performing a compare function of said first and second storages as successive images are placed in said second storage;
- said processor generating a signal when an equal compare condition is obtained;
- said signal controlling said power control system to stop movement of said first object;
- said signal also indicating to said operator that said first object is in said selected ideal position to contact or engage said second object.

10. The apparatus as in claim 9 wherein said power control system moves said first object in either a horizontal or vertical direction under control of said control system.

11. The apparatus of claim 9 wherein said operator controls include:
- a manual/automatic toggle switch;
- a display monitor for viewing the image of said second object taken by said camera and light source during the calibration phase;
- a calibration switch which is used during a calibration procedure to store said selected ideal position of said second object;
- an alignment indicator which indicates to the operator that the alignment of said first object is complete when said selected ideal position has been reached.

12. A method for calibrating a power control system to store the image of an ideal position for a first object in relation to a second object by the following steps:
- a) moving said first object to face said second object at a distance of 1–3 meters from the front of the said first object to the said second object;
- b) viewing the image of the said second object on a display monitor connected to a camera on the said first object;
- c) adjusting said first object to be in a position so that if the said first object were moved directly forward, the said first object would contact or engage the said second object in an ideal manner as judged by a human expert; and
- d) storing under control of a switch the image of the said second object as shown on said display monitor which represents the ideal position in video storage.

13. A method of operating a system for alignment of a first object with a second object including the following steps:
- a) calibrating said system to store an image of an ideal position for said second object to be contacted or engaged by the said first object using a video monitor;
- b) moving said first object in manual mode by an operator into an approximate position for contacting or engaging said first object;
- c) switching said system from manual mode to automatic mode by said operator;
- d) moving said first object in automatic mode;
- e) scanning of said second object during automatic mode to obtain a series of images of said second object as said first object is being moved;
- f) comparing said series of images of said second object with said ideal position;
- g) stopping said first object when said ideal position has been reached as indicated by said comparing step;
- h) switching said system from automatic mode to manual mode by said operator; and
- i) moving said first object by said operator to contact or engage said second object.

* * * * *